United States Patent Office

2,975,203
Patented Mar. 14, 1961

2,975,203

PHENYLVINYL-SUBSTITUTED CYCLIC SILOXANES

Donald L. Bailey, Snyder, and William T. Black, Buffalo, N.Y., assignors to Union Carbide Corporation, a corporation of New York No Drawing. Filed Oct. 31, 1955, Ser. No. 544,030

4 Claims. (Cl. 260—448.2)

This invention relates to polymerization reactions and has for an object the provision of novel chemical compounds in the form of cyclosiloxane polymers; novel compositions of matter consisting essentially of mixtures of cyclosiloxane polymers; and novel linear polymers comprised of siloxane units or groups of the cyclosiloxane polymers of the invention. More particularly, the invention contemplates the provision of (1) novel chemical compounds comprising cyclosiloxane polymers having at least one phenyl vinyl siloxane unit and at least two dimethyl siloxane units; (2) novel compositions of matter consisting essentially of mixtures of such cyclosiloxane polymers; (3) chemical products in the form of oils, fluids, gums and similar substances useful as intermediates in polymerization reactions and processes, and including (a) linear siloxane polymers comprised of phenyl vinyl and dimethyl siloxane groupings of the cyclosiloxane polymers of the invention, (b) copolymers or mixed polymers comprised of organic molecular units or monomers and phenyl vinyl and dimethyl siloxane groupings of the cyclosiloxane polymers of the invention, and (c) homopolymers obtained by addition polymerization of the cyclosiloxane polymers of the invention; and (4) plastic substances in which linear polymers are crosslinked through vinyl groups of the phenyl vinyl siloxane groupings of the cyclosiloxane polymers of the invention. A further object of the invention is the provision of specific methods and procedures for producing the novel compounds and compositions of the invention.

It is now well established in industry that many useful organosilicon compounds may be prepared by bonding various saturated organic groups or atoms to silicon atoms, and, that compounds thus prepared can be hydrolyzed to form a corresponding organosilanol which, in turn, may be dehydrated to form polymeric silicon oxides or siloxanes. Vinyl-substituted siloxanes are of significant interest because the reactivity of a silicon-bonded vinyl group permits the application of specialized curing techniques, other than conventional siloxane condensation procedures, to polymers containing unsaturated groups of this type, such, for example, as in the production of silicone rubbers. Silicon-bonded vinyl groups can be incorporated into high molecular weight siloxanes by conventional chlorosilane cohydrolysis procedures, but for many applications these techniques are not entirely satisfactory. Thus, the incorporation and uniform distribution of very small amounts of silicon-bonded vinyl groups within a polymer would be difficult to control in cohydrolysis. Further, in lieu of crude cohydrolyzates, a particular process or reaction may require individual low molecular weight siloxanes as starting materials either for reasons of economy or because of the desired mechanism of reaction sought, and the compounds and compositions of the present invention are ideally suited for this purpose. Specifically, the compounds and compositions of the invention are useful intermediates in the preparation of phenyl and vinyl modified silicone polymers suitable for use in the preparation of silicone elastomers, and in the preparation of copolymers with organic olefinic materials. The compounds and compositions may be equilibrated with known siloxanes to yield a variety of polymeric substances.

The group of cyclosiloxane polymers constituting the compounds and compositions of the invention may be defined as follows:

(1) Phenylvinylsiloxane, bis(dimethylsiloxane) cyclic trimer,

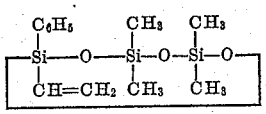

and the isomeric forms thereof, which may be represented, also, by the formulae

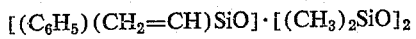

or

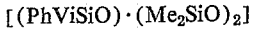

wherein Ph and Me represent the phenyl and methyl groups, respectively, and Vi represents the vinyl group;

(2) Phenylvinylsiloxane, tris(dimethylsiloxane) cyclic tetramer,

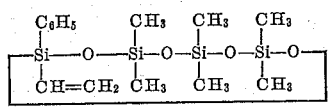

and the isomeric forms thereof, which may be represented, also, by the formulae

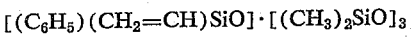

or

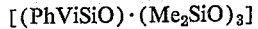

wherein Ph, Me and Vi have the meanings assigned above; and (3) Bis(phenylvinylsiloxane), bis(dimethylsiloxane) cyclic tetramer,

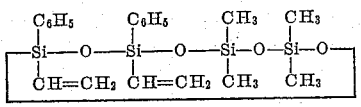

and the isomeric forms thereof, which may be represented, also, by the formulae

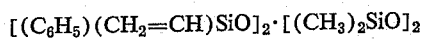

or

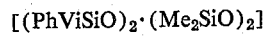

wherein Ph, Me and Vi have the meanings assigned above.

While the compounds of the invention are, themselves, essentially cyclosiloxane polymers when considered independently as chemical compounds, they function as monomers when employed in the production of linear polymers, each forming a monomeric constituent of the polymer chains comprising oils or fluids, gums and other intermediates suitable for use in carrying out further polymerization reactions. They provide for effective crosslinking between and among linear polymers and copolymers through the agencies of the unsaturated hydrocarbon groups contained therein.

Preparation of the novel hydrocarbon-substituted cyclosiloxane polymers of the invention may be effected by conventional procedures involving cohydrolysis of mixed hydrocarbon-substituted dichlorosilanes in which the substituent groups consist of saturated and unsaturated groups, i.e., dimethyl-substituted dichlorosilane and phenylvinyl-substituted dichlorosilane, to produce a crude cohydrolyzate containing hydrocarbon-substituted cyclosiloxanes whose hydrocarbon substituents consist of mixed phenyl and vinyl groups, and methyl groups, followed by filtration and fractionation of the cohydrolyzate to separate and recover separate phenylvinyl, methyl-substituted cyclosiloxane polymers or mixtures of phenylvinyl, methyl-substituted cyclosiloxane polymers.

The invention may be best understood by reference to the following specific examples of typical preparations and recoveries of compounds and compositions of the invention:

EXAMPLE I

*Preparation of:*

(1) *Phenylvinylsiloxane, bis(dimethylsiloxane) cyclic trimer,*
(2) *Phenylvinylsiloxane, tris(dimethylsiloxane) cyclic tetramer, and*
(3) *Bis(phenylvinylsiloxane), bis (dimethylsiloxane) cyclic tetramer*

Phenylvinyl dichlorosilane, in amount 591.5 grams, and dimethyl dichlorosilane, in amount 1070 grams, were admixed and added slowly to a mixture of 1000 cc. of isopropyl ether and 500 cc. of water so as to maintain the ether refluxing gently, and, thereafter the solution was refluxed for three (3) hours. The water layer was drawn off by suction filtration and the etheral solution refluxed for two (2) hours over sodium bicarbonate. The solution was then filtered and washed with water until neutral and subjected to a fractional distillation treatment. Of the separate fractions recovered, only fractions one (1) and six (6) were analyzed since the intermediate fractions appeared to be mixtures of the three compounds identified above.

Fraction one (1) was found to be a mixture of the phenylvinylsiloxane, bis(dimethylsiloxane) cyclic trimer, and the phenylvinylsiloxane, tris(dimethylsiloxane) cyclic tetramer, having the physical properties indicated in the following table. The mixture can be further separated into the individual compounds by careful fractionation in an efficient fractionating column, but this is not essential since the mixture undergoes the same types of reactions as do the individual compounds.

ANALYTICAL DATA
[(PhViSiO)·(Me$_2$SiO)$_2$ and (PhViSiO)·(Me$_2$SiO)$_3$]

|  | Found for Mixture | Theoretical (PhViSiO)·(Me$_2$SiO)$_2$ | Theoretical (PhViSiO)·(Me$_2$SiO)$_3$ |
|---|---|---|---|
| Boiling Point (° C.) | 70–80°/0.15 mm. | | |
| Refractive Index ($n_D$ at 25° C.) | 1.4544 | | |
| Bromine Absorption (gr. Br/100 gr. product) | 48 | 54 | 43.2 |
| Silicon (percent) | 29.6 | 28.4 | 30.2 |
| Molecular Weight | 396 | 396 | 470 |

Fraction six (6) was found to be the bis(phenylvinylsiloxane), bis(dimethylsiloxane) cyclic tetramer, having the following physical properties:

ANALYTICAL DATA
[(PhViSiO)$_2$·(Me$_2$SiO)$_2$]

|  | Found | Theoretical |
|---|---|---|
| Boiling Point (° C.) | 140–147/0.35–0.45 mm. | |
| Refractive Index ($n_D$ at 25° C.) | 1.4969 | |
| Density ($d_4^{25}$) (gr./cc.) | 1.07 | |
| Bromine Absorption (gr. Br/100 gr. product) | 68.4 | 72 |
| Silicon (percent) | 25.0 | 25.2 |
| Carbon (percent) | 53.8 | 54.0 |
| Hydrogen (percent) | 6.6 | 6.3 |
| Molecular Weight | 452 | 494 |

In an analogous manner, we may also prepare the phenylvinylsiloxane cyclic trimer and tetramer compounds, i.e., phenylvinylsiloxane cyclic trimer (PhViSiO)$_3$ and phenylvinylsiloxane cyclic tetramer (PhViSiO)$_4$, as well as the tris phenylvinyl tetramer, i.e., tris (phenylvinylsiloxane) dimethylsiloxane cyclic tetramer, $$[(C_6H_5)(CH_2=CH)SiO]_3 \cdot [(CH_3)_2SiO]$$

EXAMPLE II

*Preparation of gum copolymers from octamethylcyclotetrasiloxane, $[(CH_3)_2SiO]_4$, and bis (phenylvinylsiloxane), bis (dimethylsiloxane) cyclic tetramer*

*Preparation.*—125 grams of octamethylcyclotetrasiloxane, 0.55 grams (0.29 percent-by-weight) of the bis (phenylvinylsiloxane), bis (dimethylsiloxane) cyclic tetramer obtained in Example I, and 0.08 gram of potassium dimethylsilanolate catalyst (containing 4 percent-by-weight potassium), were mixed in a flask. Thereafter, the flask was heated at 150° C. for sixteen hours during which time polymerization took place and there was formed a water-white gum containing 0.15 mole percent of phenylvinylsiloxane units.

*Compounding.*—The above gum was compounded into a silicone elastomer by milling 100 parts thereof with 35 parts of "Santocel C.S." (finely-divided silica) filler and 1.0 part of ditertiarybutyl peroxide catalyst. The mixture was mold-cured at 175° C. for 25 minutes. The resulting silicone elastomer was found to have the following properties:

*Elastomer properties*

MOLD CURE

| Tensile (p.s.i.) | Elongation (percent) | Hardness (Shore A) |
|---|---|---|
| 900 | 500 | 48 |

POSTCURED (24 HOURS AT 250° C.)

| | | |
|---|---|---|
| 800 | 350 | 63 |

More detailed information with respect to the production of various intermediate polymeric compounds incorporating phenyl vinyl siloxane units of the type herein described, and silicone elastomers produced from such compounds, as well as methods and procedures for the production and compounding of such intermediates and elastomers, may be obtained by reference to our copending U.S. application, Serial No. 470,834, which was filed jointly with M. L. Dunham on November 23, 1954, and is entitled "Silicone Elastomers."

Since it is considered obvious that many changes and modifications can be made in the foregoing methods and procedures without departing from the nature and spirit of our invention, it is to be understood that the invention is not to be limited to the specific details offered by way of illustration above, except as set forth in the following claims.

We claim:

1. A polymeric substance selected from the group consisting of the compounds phenylvinylsiloxane bis(dimethylsiloxane) cyclic trimer, phenylvinylsiloxane tris(dimethylsiloxane) cyclic tetramer, and bis(phenylvinylsiloxane) bis(dimethylsiloxane) cyclic tetramer.

2. The chemical compound phenylvinylsiloxane, bis(dimethylsiloxane) cyclic trimer represented by the formula:

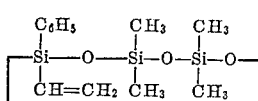

3. The chemical compound phenylvinylsiloxane, tris- (dimethylsiloxane) cyclictetramer represented by the formula:

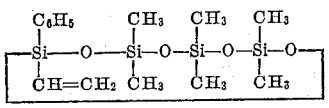

4. The chemical compound bis(phenylvinylsiloxane), bis(dimethylsiloxane) cyclic tetramer represented by the formula:

$$[(C_6H_5)(CH_2=CH)SiO]_2 \cdot [(CH_3)_2SiO]_2$$

References Cited in the file of this patent

UNITED STATES PATENTS

| | | |
|---|---|---|
| 2,445,794 | Marsden | July 27, 1948 |
| 2,645,628 | Hurd | July 14, 1953 |
| 2,737,506 | Hurd et al. | Mar. 6, 1956 |
| 2,756,246 | Burkhard | July 24, 1956 |

OTHER REFERENCES

Young et al.: "Journal American Chemical," volume 70 (November 1948), pages 3758 and 3761.

Rochow: "An Introduction to the Chemistry of the Silicones," 2nd edition (1951), John Wiley & Sons, Inc., New York, publishers, pages 69–70 and 79–81.